United States Patent Office 2,902,463
Patented Sept. 1, 1959

2,902,463

POLYESTERS OF A MIXTURE OF DICARBOXYLIC ACIDS HAVING TEN CARBON ATOMS AND PROCESS OF MAKING SAME

Christian W. Johnston, Chicago, Ill., and Robert A. Meara, Baltimore, Md., assignors to National Distillers and Chemical Corporation, New York, N.Y., a corporation of Virginia No Drawing. Application August 19, 1955
Serial No. 529,569

6 Claims. (Cl. 260—45.4)

This invention relates broadly to a new class of polyesters from selected branched chain diacids, and especially relates to polyesters derived from mixtures of $C_{10}$ diacids, which polyesters are particularly effective as plasticizers for resinous and rubbery polymers and copolymers. More specifically, this invention relates to resin compositions plasticized with polymeric esters of $C_{10}$ branched chain diacids and mixtures of such diacids.

It is an object of this invention to provide a novel class of polyester products useful as plasticizers and softening agents for high molecular weight organic materials, including vinyl resins.

It is another object of this invention to provide a novel class of polyesters and derivatives thereof having highly useful properties of value in the field of synthetic rubbers, resins, synthetic fibers, lubricants, and others and especially of value in the field of plasticizers.

A further object of this invention is to provide novel plasticized compositions of resinous and rubbery polymers and copolymers having incorporated therein the polyesters prepared from selected branched chain $C_{10}$ diacids. Further objects will become apparent from the detailed description set forth below.

The ever increasing manufacture and uses of plastic materials such as the vinyl resins, ethyl cellulose acetate or nitrate, polyacrylate resins, polymethylmethacrylate resins, rubbers such as the emulsion copolymers of butadiene with a minor amount of styrene of acrylonitrile, or the copolymers of isobutylene with small amounts of a diolefin such as isoprene or butadiene have created a large demand for suitable plasticizers therefor. This is particularly true in the case of vinyl resins such as vinyl chloride, vinyl acetate, and copolymers of these materials.

A number of polyesters have been proposed and used as plasticizers for resins, especially for the vinyl polymers and copolymers. For example, certain polyesters derived from the sebacates, adipates, and the like are well known plasticizers for various polymeric and resinous materials.

These polymeric polyesters possess many properties that are desirable in plasticizers. Their permanence is generally outstanding. They do not volatilize, migrate, nor are they easily extracted in any manner from the vinyl polymer or copolymer bases or other basic resins into which they may be incorporated as plasticizers.

Generally, polymeric plasticizers are used in high quality resin or polymer products such as upholstery materials, raincoats, handbags, belts, shoes, and better quality novelty items in which it is absolutely essentially that no exudation or migrating of the plasticizers occurs.

It has now been discovered that new polyesters can be derived from esterification and transesterification reactions using isomeric, branched chain $C_{10}$ aliphatic diacids and mixtures containing substantial amounts of such branched chain diacids, and especially a mixture of such $C_{10}$ diacids made up from and including substantial amounts of α-ethylsuberic and α,α′-diethyladipic acids, that is, $C_{10}$ diacids having at least one $C_2$ side chain per molecule. These branched chain $C_{10}$ diacids and mixtures thereof are preferably, but not necessarily, obtained as mixtures and by a particular method as further described below.

It has recently been found that an aliphatic conjugated diolefin can be treated with finely dispersed sodium or potassium in a selected ether medium and in the presence of a relatively small amount of polycyclic aromatic hydrocarbon and/or a solid attrition agent at a temperature preferably below 0° C. to give a mixture of dimetallo derivatives of the dimerized diolefin. These dimetallo derivatives can then be carbonated at a temperature below 0° C. to give the corresponding salts of dicarboxylic acids in high yields and selectivities.

In the case of the initial reaction using sodium and butadiene, the product obtained comprises the disodium derivatives of the aliphatic isomeric octadienes. Studies of the structure of the saturated diacids arising therefrom after carbonation and hydrogenation indicate that mixtures of isomeric $C_{10}$ dicarboxylic acids are obtained. Thus, following final hydrogenation and acidification, the product mixture yields sebacic acid, α-ethylsuberic acid, and α,α′-diethyl adipic acid, together with small amounts of other acids including monobasic carboxylic acids.

In the preferred type of operation, the butadiene and finely dispersed sodium are reacted in an attrition apparatus such as a ball mill or pebble mill, with a selected solid attrition agent. This material is most conveniently solid sodium chloride or sodium sulfate. The disodiooctadienes formed are subsequently carbonated to the unsaturated $C_{10}$ diacids. Organic solvents are then removed and the solids are converted to an aqueous solution, which is preferably filtered prior to hydrogenation. A catalytic hydrogenation is then carried out to convert all acidic compounds to completely saturated acids.

The resulting final reaction mixture contains varying amounts of sodium salts of isomeric $C_{10}$ dicarboxylic acids. It also contains the valuable branched chain $C_{10}$ acids as well as small amounts of monobasic acids of varying molecular weights from $C_4$ to $C_{10}$.

The major portions of the linear isomer, sebacic acid, can be separated from this mixture for instance, by saturation of the solution with sodium chloride and addition of controlled amounts of a strong acid. Benzene extraction can also be used. This separation produces an isomeric mixture of $C_{10}$ aliphatic dicarboxylic acids containing from 60–90% α-ethylsuberic acid, 10–25% of α,α′-diethyladipic acid, and the remainder, 0–15% substantially sebacic acid. Generally, the polyester products as embodied herein are prepared by subjecting a suitable glycol and the appropriate $C_{10}$ acidic reactants above described to esterification or transesterification reaction conditions with elimination of water or other by-product formed by the esterification reactions.

The polyesters useful for the herein described purposes can be prepared by conventional esterification methods, with or without a catalyst. The preferred method of polyester synthesis involves refluxing the mixed isomeric diacids and the selected glycol or glycols with or without a diluent such as an inert solvent suitable for lowering the reflux temperature. The resulting polyester product is then washed in the usual manner to remove any residual acid and dried over a drying agent. Alternatively, the desired polyester may be made by ester interchange from the corresponding dimethyl or diethyl esters.

In preparation of the novel polyester products embodied herein, any of a wide variety of glycols may be employed, including saturated and unsaturated aliphatic glycols that may include a wide range of carbon atom content. Thus, glycols useful for practice of the invention include ethylene glycol, diethylene glycol, 1,2-propylene glycol, 1,3-butylene glycol, 1,6-hexanediol, octamethylene glycol, dodecamethylene glycol, 2-ethyl-1,8-octanediol, 3-ethyl-1,10-decanediol, 3,6-diethyl-1,8-octanediol, 4,7-diethyl-2,9-decanediol, 3,13-tetradecanediol, and others as well as mixtures thereof.

The condensation of the glycols with the acidic reactant may be accomplished by heating the reactants, preferably at 100–250° C., or higher, with or without a diluent. Use of a slight excess of glycol is preferred to insure that little or no acidic component remains in the final ester product. For relatively non-acidic products, the terminal groups will be predominantly alcoholic hydroxyl groups. During the reaction, the water by-product that is formed should be removed from the reacting mixture by distillation in order to insure completion of the esterification reaction.

There is used for ester formation with the glycol, an acidic reactant or preferably a mixture of reactants which contain branched chain $C_{10}$ aliphatic dibasic acids, having at least one $C_2$ branch per molecule. Thus, these novel polyesters are characterized by containing a plurality of units of the following structure:

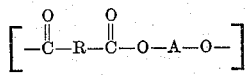

wherein R is a hydrocarbon portion of a $C_{10}$ saturated aliphatic diacid and A is the hydrocarbon portion of a glycol; said polyesters being further characterized in that the major proportion of such units in the polyester is such that R is the hydrocarbon portion of a $C_{10}$ saturated alpihatic diacid containing at least one $C_2$ branch chain.

The polyesters thus obtained from this $C_{10}$ diacid mixture are highly useful as plasticizers and the polyesters of the individual branched chain $C_{10}$ diacids were also found to be particularly outstanding. It is a surprising and outstanding feature of this invention that the mixed branched chain esters are better in many properties and give better plasticized compositions than the more linear polyester products such as those, for example, from sebacic acid or adipic acid.

The invention also relates to plasticized resin compositions containing the novel polyesters as plasticizers, usually in proportions ranging from about 5 to 100 parts or preferably about 30 to 60 parts per 100 parts of resin. Polymeric materials which lend thmeselves to successful plasticization with the polyesters of the invention include the various vinyl resins such as polyvinyl chloride, polyvinyl acetate, copolymers of vinyl chloride with vinyl acetate, or vinyl chloride, polyvinyl butyral or other polyvinyl acetals and polyvinylidene chlorides. The polyesters can also be used with acrylate and methacrylate resins, rubber-like polymers of diolefinic materials such as butadiene-nitrile, butadiene-styrene or polychloroprene elastomers, or isobutylene-diolefin copolymers or any other polymer materials customarily requiring plasticization. Mixtures of these classes of materials may also be used. It should be understood that in addition to the plasticizer, the polymer compositions may also contain about 1 to 10 or 25 parts of conventional stabilizers such as basic lead carbonate, lead stearate, sodium borate, or the like, as well as suitable amounts of oleic acid, auxiliary plasticizers or softeners, fillers, pigments and the like.

It has been particularly observed from the extensive testing carried out on the novel resin and polymer compositions plasticized with the herein described polymeric polyester plasticizers, that these novel polyesters when employed as plasticizers are superior to other well-known and widely used polymeric plastizers in plasticizer efficiency, in exudation tests, in accelerated service tests, and in tensile strength properties, while at the same time, exhibiting at least equivalent qualities in all other properties studied.

As a result of the type and amounts of reactants employed in their formation, the polyesters as embodied herein may contain active terminal groups which are either carboxyl or hydroxyl groups depending upon whether an acid or a glycol was the last compound to react in the formation of the polyester molecule. The esters described herein may then be lengthened by controlled reaction between such active terminal groups and other reagents. Generally, the polyester is lengthened further by reaction between such hydrogen-bearing terminal groups and a material which is reactive therewith.

The degree and state of polymerization of the polyesters prepared as embodied herein may be conveniently determined by analysis for the average number of carboxyl and hydroxyl groups in a given amount of the polyester. The acid number is a measure of the number of terminal carboxyl groups, and the hydroxyl number is a measure of the number of terminal hydroxyl groups. The sum of the carboxyl and hydroxyl numbers indicates the reaction number, i.e., the average number of reactive terminal groups present in the polyester product which, in turn, is an indication of the degree of polymerization.

Such $C_{10}$ diacids as above described, or mixtures thereof, may be used as the sole acidic reactant for polyester formation or mixtures with the glycol or mixtures of glycols, or the acidic reactant may comprise, in addition to the branched chain $C_{10}$ dicarboxylic acids, another acid or mixture of acids whereby the resulting ester product comprises a copolyester of said $C_{10}$ diacids and said other acid. For such usage, the other acid may be any of a wide variety of dibasic acids, or their anhydrides, including succinic acid, adipic acid, methyladipic acid, fumaric acid, maleic acid, malic acid, dihydromuconic acid, azelaic acid, sebacic acid, suberic acid, phthalic acid, terephthalic acid, and others. For preparation of unsaturated polyesters, maleic anhydride is particularly suitable for use as a component of the acidic reactant.

Additionally, monobasic acids may be included in the acidic reactant in certain instances, and particularly as chain stopping agents when it is desired to control the extent of polymerization of the polyesters formed by esterification reaction between a suitable glycol and the diacidic reactants. For such a purpose, suitable acids include acetic acid, propionic acid, butyric acid, valeric acid, pelargonic acid, and higher monocarboxylic acids.

In preparation of the products embodied herein, mixtures of various of the glycols and acids, in addition to the branched chain $C_{10}$ diacid component, can also be used, the resulting products being mixed polyesters.

The following examples are presented to illustrate the present invention, though it is to be understood that the invention is not limited thereto and that certain modifications or variations thereof are possible without departing from the spirit of the invention or from the scope of the appended claims. It will be understood that all quantitative proportions referred to are expressed on a weight basis, unless expressly indicated otherwise.

EXAMPLE 1

The polyester polymers of $C_{10}$ dibasic acids were prepared and tested. The $C_{10}$ dibasic acids were obtained as mixtures by the selective dimerization of butadiene using finely dispersed sodium in the presence of an ether reaction medium and preferably with a small amount of a polycyclic aromatic hydrocarbon and/or a solid attrition agent to obtain a mixture of disodiooctadienes which is then carbonated to yield the mixture of $C_{10}$ diacids.

A typical sample of the mixed $C_{10}$ aliphatic diacids, from which most of the sebacic acid has been removed, shows the following properties:

Melting range _____ 68–74° C.
Iodine number _____ less than 1
Neutralization equivalent _____ 101–102

Such a sample has been analyzed to a distribution approximately as follows:

| | Percent |
|---|---|
| α-ethylsuberic acid | 75 |
| α,α'-diethyladipic acid | 12 |
| Sebacic acid | 10 |

The mixture of $C_{10}$ dicarboxylic acids which is considered to be especially well adapted for this use consists essentially of about 60–90 weight percent α-ethylsuberic acid, about 10–25 weight percent, α,α'-diethyladipic acid, and about 0–15 weight percent sebacic acid.

The α-ethylsuberic acid and α,α'-diethyladipic acid and the dimethyl esters therefrom were prepared by suitable steps of acidification, extraction, esterification, hydrogenation, and the like, using known methods and procedures.

In the following preparation of the esters, the general procedure followed was trans-esterification of esters of low boiling alcohols with higher boiling alcohols, using trans-esterification catalysts, while removing the lower boiling alcohol by rectification.

A relatively pure α-ethylsuberic acid as derived from the process outlined above, in the form of the dimethyl ester was employed as starting material. A dipropylene glycol ester of the α-ethylsuberic acid was prepared by trans-esterifying the dimethyl α-ethylsuberate (1 mole) with propylene glycol (2 moles). This trans-esterification required approximately 80 to 90 hours at 200° C. with no catalyst. The resultant diglycol ester was converted into a higher weight polymer by removing propylene glycol at reduced pressure with nitrogen sparging. As the propylene glycol was removed, the material becomes integrated into a higher molecular weight compound. As the polyester polymer is built up, samples are taken at various times for the purpose of determining viscosities and molecular weights and other tests by the ebullioscopic method as well as for obtaining saponification numbers. A crude correlation can be made between polymer size and viscosity which is useful in determining molecular weights by viscosity measurements. The particular polyester prepared by this method had a final viscosity of 59.1 poises and a molecular weight as determined by the ebullioscopic method of approximately 1650.

EXAMPLE 2

Another polyester polymer was made by trans-esterifying the dimethyl α-ethylsuberate (1 mole) with propylene glycol (2 moles). In this case no catalyst was used and the time for this process was about 140 hours.

The resultant diglycol esters were converted to polymers by heating at reduced pressure with slight nitrogen blowing. The process consists of the removal of a molecule of glycol causing the building of a molecule that actually is an addition of the two parent molecules minus the glycol. Thus, if the diacid molecule is represented by HOOCRCOOH and the propylene glycol by HO-Pr-OH, the initial diglycol molecules are HOPrOOCRCOOPrOH and the following reactions take place during the subsequent heating.

(1) HOPrOOCRCOOPrOH+
HOPrOOCRCOOPrOH yields
HOPrOOCRCOOPrOOCRCOOPrOH+HOPrOH (2) HOPrOOCRCOOPrOH+
HO(PrOOCRCOOPr)$_n$OH yields
HO(PrOOCRCOOPr)$_{n+1}$+HOPrOH The reaction is forced to completion by the removal of the glycol and the polymerization process continues to produce a very large molecule which, in its limiting composition, has a 1:1 mole ratio of glycol to acid.

The uncatalyzed polymer had a final molecular weight of 1758 by the ebullioscopic method. Its viscosity was 208 stokes. No difficulty in handling this polyester was noted at any time.

EXAMPLE 3

The simple dipropylene glycol ester of α-ethylsuberic acid from butadiene dimerization was prepared from the corresponding dimethyl ester by trans-esterification. Sodium methoxide was added as part of the charge. The time in this case was only 35 hours. When sodium was introduced as a trans-esterifying catalyst, the time required for the production of the ester was thus markedly reduced. On the other hand, when lime was added, the results obtained indicated that lime was inefficient and substantially useless for such purposes. The required amount of excess glycol must be removed to produce high molecular weight substances. In order to have the reaction completed within a reasonable period of time, heat and reduced pressure were used. Some decomposition takes place when temperatures of 200° C. and above are exceeded for any substantial period of time. More moderate temperature conditions give good color and a moderately high molecular weight polymer.

During the polymerization process, the time factor also points to the advantageous use of sodium, and by using sodium thusly, the time for this phase was reduced from 59 hours to 18.5 hours. The sodium soaps may cause emulsions of the polymer and water, making catalyst separation more difficult. Washing with concentrated sodium chloride solutions, however, assists in making the separation more complete. The final traces of water are removed by azeotropic distillation using benzene.

During the polymerization processes, samples were removed at various times for ebullioscopic determinations of molecular weight buildup.

The relation of viscosity to molecular weight for the hydroxy end-blocked polymers described in the foregoing examples is as follows:

| Polyester Sample | Molecular Weight | Viscosity in Stokes |
|---|---|---|
| Example 1 | 1,650 | 59.1 |
| Example 2 | 1,758 | 208 |
| Example 3 | 1,862 | 328 |

EXAMPLE 4

For the preparation of the acetic end-blocked polymer a portion of the hydroxyl end-blocked polymer prepared as described above was placed in a flask with a small amount of benzene to reduce the viscosity and control the temperature. The calculated amount of acetic anhydride plus a 10% excess was added to the charge through a condenser. A rise in temperature occurred. After heating for one hour at 130° C. the acid value was found to be 53.6; 30 cc. of the benzene added were removed at this time. The final acid value after 3½ hours of cooking followed by cooling was 48.6. After filtration and removal of the benzene and acid by distillation, the final acid value was 4.15.

The acetic end-blocked polymer showed a molecular weight of 1055 and a viscosity of 268 stokes, giving an indication that, relatively, the viscosity is larger for acetic acid end-blocking.

Tabulated details of the preparation and properties of the specific diesters prepared are shown in Table I below:

*Table I*

[Preparation and properties of novel plasticizers]

| Polymer Polyester No.[1] | Molecular Weight | Viscosity (Stokes) | Color (G & H) | Acid Value | Specific Gravity |
|---|---|---|---|---|---|
| 1 | 1,650 | 59 | 3 | 9.2 | |
| 2 | 1,758 | 208 | 13.5 | 4.1 | 1.06 |
| 3 | 1,862 | 328 | 11.5 | 8.5 | 1.06 |
| 4 | 1,055 | 268 | 13.8 | 4.2 | 1.07 |

[1] Polyesters Nos. 1, 2 and 3 have terminal hydroxy groups. No. 4 is end-blocked with acetic acid.

EXAMPLE 5

A mixture of dibasic acids, 202 parts, consisting approximately of 5% sebacic acid, 25% α,α'-diethyladipic acid and 70% α-ethylsuberic acid was introduced into a three-necked reactor fitted with a stirrer, thermometer, gas inlet tube, distilling head and condenser. To the acid was added (127 parts) diethylene glycol. The molar ratio of dibasic acid to glycol was 1:1.2. Carbon dioxide gas was bubbled through the mixture throughout the esterification. The reaction was accomplished by raising the temperature to 165–200° C. until almost all the water was distilled away. The temperature was then raised gradually to 220° C. and the pressure gradually reduced to 10 mm. Hg. After 10 hours, a golden yellow, very viscous product was obtained. Determinations showed the acid number to be 23.2 and the hydroxyl number to be 23.0. This polyester product is useful as polymeric plasticizer for vinyl resins.

EXAMPLE 6

These new plasticizers and compositions therefrom were compared with various well known polymeric type of polyester plasticizers when compounded into a well known vinyl copolymer Vinylite VYNW, a copolymer of 95% vinyl chloride and 5% vinyl acetate.

The effectiveness and various specific properties of the novel polyester polymers as plasticizers and in comparison with well known comparative products were determined by the following method. The polyester plasticizer is blended into the vinyl resin powder to give a uniform mixture. This mixture is then worked on heated mill rolls, for a period of time until it forms a homogeneous plastic mass. The mixture is sheeted off the mill and molded under suitable heat and pressure to form uniform plastic sheet stock. From these sheets, the test specimens are cut. The properties of the specimens were then compared with sheets plasticized with some commercially accepted materials employed as controls. Polyester polymer No. 1 has not been included since its viscosity and other properties are somewhat different and it is not directly comparable with the other products.

Control 1 is a sebacic acid-propylene glycol polyester with terminal hydroxy groups. The molecular weight is believed to be about 8000.

Control 2 is an adipic acid analog of the polyester of control 1.

Control 3 is an adipic acid-propylene glycol polyester, end-blocked with stearic acid. The molecular weight is about 2200.

PROCESSING CHARACTERISTICS

The relative ease of processing of the polyester-resin mixture is quite essential. Since the polyesters are generally more viscous they are harder to compound, and higher temperatures are used to incorporate them into the resins. All the new polyesters were found to blend into the resins quite satisfactorily and in this respect they were equivalent to the control products.

The high viscosity of the resinous type plasticizers makes the processing of the vinyl resin into sheeting and the like more difficult. The experimental materials blended, milled, and molded in about the same manner as did the control polyesters.

The control material, #3, processes with less difficulty as it was created to have properties intermediate between the very viscous control #1 and control #2 and the quite fluid monomerics. Such easy processing materials suffer by being less permanent, however.

BRITTLENESS TEST

This test is intended to determine the ability of plastic materials to resist the effect of low temperature in causing them to become brittle so as to cause fracture when they are bent.

Strips of the milled stock (resin and plasticizer) are immersed in the tank of the test machine which contains a cooling liquid, and clamped at one end of the test strip. The temperature of the cooling is varied in 5° C. intervals. At each temperature interval, the test specimens are subjected to a single sharp blow.

The brittle temperature is defined as the lowest temperature of non-failure of 5 consecutive test specimens under the specified test conditions.

It should be realized that resinous type plasticizers give rather poor performance at low temperatures. They impart poorer resistance to flex and shock a low temperatures than do most monomeric types.

As the molecular weight of the hydroxy terminated polymeric materials increased, their performance in vinyls became poorer. Both resistance to fold-flexing and brittle point suffered. This was true of both the controls and the novel products.

FOLD ENDURANCE TEST

This is based on ASTM test D643–43. The test involves holding a strip of plastic under definite tension and bending it repeatedly around a curved surface until failure occurs.

Test speciments cut from the milled stock are placed in the jaws of the M.I.T. Fold Endurance Tester, and a tension of 1 kilogram is applied. The test specimens are flexed at 0° C. until failure occurs. The results reported are the average number of flexes before failure occurs.

Since the polyester plasticizers do not in general yield materials as pliable as the monomeric plasticizer materials, they tend to decrease resistance of the resin stock to fold-flex resistance. The experimental polyesters were found to give about the same amount of resistance to this test as the control products.

PERMANENCE

It is also a requirement that an article of manufacture should possesses its original properties, particularly those imparted by the plasticizer, through its entire period of use. The plasticizer should not volatilize, it should not be readily extracted by water or soap and detergent solutions, or oils or gasolines and the like, and it should not migrate into adjacent finishes and coatings to soften or mar them.

Permanence is an outstanding characteristic of the resinous or polymeric type plasticizers. Their resistance to volatilization, migration and extraction insure long service life to products that must stand up even under severe exposure to high temperatures, water and soap solutions, and oil or gasoline.

The higher molecular weight experimental materials meet these severe tests as well as in some cases better than the control materials do.

ACCELERATED SERVICE TEST

This test is used for determining the effects of specified changes of atmospheric temperature and humidity upon plasticized plastic articles. A procedure based on ASTM test D756–46T was used with the following test cycle:

24 hours at 175° F. (79.4° C.) over water—followed by 24 hours at 175° F. (79.4 C.) in an oven The percent change in weight and any change in appearance of the specimen is reported.

Both controls #2 and #3 showed exudation during the severe accelerated service test which exposes the stock to 100% relative humidity at 79° C. Among the control plasticizer products, although control #1 showed the best over-all properties, it is more volatile than any of the novel materials. Controls 2 and 3 are inferior since they exhibit exudation. Table II shows the data obtained in these tests.

Table II
[Accelerated service tests]

|  | Control #1 | Control #2 | Control #3 | Polyester #2 | Polyester #3 | Polyester #4 |
|---|---|---|---|---|---|---|
| Plasticizer Concentration, percent | 33.3<br>37.5<br>39.8<br>42.9 | 33.3<br>37.5<br>39.8<br>42.9 | 33.3<br>39.8<br>42.9 | 28.5<br>33.3<br>37.5 | 28.5<br>33.3<br>37.5 | 28.5<br>33.3<br>37.5 |
| Plasticizer Concentration, parts/100 parts resin | 50<br>60<br>66<br>75 | 50<br>60<br>66<br>75 | 50<br>66<br>75 | 40<br>50<br>60 | 40<br>50<br>60 | 40<br>50<br>60 |
| Accelerated Service, percent | 0.0<br>−.13<br>−.12<br>−.04 | Exudation<br>do<br>do<br>do | Exudation<br>do<br>do<br>do | −.03<br>−.03<br>−.09 | −.08 | −.05 |

VOLATILITY

Two methods were used to measure the volatility of the plasticizers from the stock. One was the severe exposure of the stocks in a circulating air oven at 100° C. The other consisted of enclosing specimens in a container of activated carbon for two days at 80° C.

This test is a slightly modified version of the test developed by the Society of the Plastics Industry.

Triplicate specimens, 2.69 inches in diameter x .065 inch thick, are weighed analytically. 100 cc. of Columbia activated carbon, 6/14 mesh, grade AC is placed in the bottom of a 1-pint paint can. A sample is placed on the carbon and covered with 100 cc. of carbon, followed by a second sample which is covered with 100 cc. of carbon, followed by a third sample and 100 cc. of carbon to fill the can. The lid is placed tightly on the can and the can placed upright in an oven at 80° C.+2° C. for 24 hours. The can is then removed, allowed to cool for 15 minutes and opened. The test pieces are removed, brushed free of carbon and weighed. The percent loss of plasticizer on the basis of total film weight is reported as is the original plasticizer concentration.

Exposure in an oven with circulating air and heating in a container of activated carbon were the two methods used to study volatility. Weight losses are determined in both tests and in the former tensile properties are compared before and after exposure.

Table III shows data from the volatility tests carried out by exposure of vinyl chloride-vinyl acetate copolymer with 33.3% of plasticizer as indicated for seven days at 100° C. in a circulating air oven.

Table IV shows data determined by the above described carbon volatility test.

Table III
[Volatility and stability test]

| Plasticizer | Tensile Strength, p.s.i. | | 100% Modulus, p.s.i. | | Weight of Total | Loss, percent as Plasticizer | Remarks |
|---|---|---|---|---|---|---|---|
|  | Before | After | Before | After |  |  |  |
| Polymer #2 | 3,990<br>±160 | 3,500<br>±190 | 3,090<br>±330 | 2,750<br>±100 | 0.33 | 0.99 | Sl. lighter; flex. same. |
| Polymer #3 | 4,000<br>±275 | 3,700<br>±130 | 3,400<br>±150 | 3,100<br>±140 | 0.24 | 0.72 | Much darker; flex. same. |
| Polymer #4 | 3,600<br>±100 | 3,400<br>±190 | 2,900<br>±160 | 2,800<br>±110 | 0.25 | 0.75 | Sl. lighter; flex. same. |
| Control #1 | 3,770<br>±70 | 3,500<br>±140 | 3,060<br>±70 | 2,800<br>±110 | 0.29 | 0.87 | Darker; flex. same. |
| Control #2 | 3,880<br>±250 | 3,730<br>±220 | 3,200<br>±190 | 3,140<br>±220 | 0.21 | 0.63 | Darker, mottled; sl. stiffer. |
| Control #3 | 3,750<br>±50 | 3,600<br>±250 | 2,470<br>±40 | 2,550<br>±210 | 0.65 | 1.95 | Darker; sl. stiffer. |

Table IV
[Volatility test]

|  | Control #1 | Control #2 | Control #3 | Polyester #2 | Polyester #3 | Polyester #4 |
|---|---|---|---|---|---|---|
| Plasticizer Concentration, parts/100 parts resin | 50<br>60<br>66<br>75 | 50<br>60<br>66<br>75 | 50<br>66<br>75 | 40<br>50<br>60 | 40<br>50<br>60 | 40<br>50<br>60 |
| Volatility (carbon), percent | −.12<br>−.13<br>−.14 | −.10<br>−.02<br>−.22 | −.35<br>−.33<br>−.35 | −.10<br>−.13<br>−.12 | −.03<br>−.04<br>−.06 | −.03<br>−.05<br>−.07 |

The novel polyesters were, in every case, better than the polyesters in use, and in some cases, the new compounds exhibited substantially better volatility characteristics. For example, experimental polymer #3 was shown to be somewhat less volatile than control #1. Control #3 was three times more volatile than polymer #1.

Both tests indicate that permanence of the experimental polyesters is improved by increasing molecular weight. End-blocking with acetic acid also favors permanence in the experimental polymers. The tensile properties after heating are not materially affected.

RESISTANCE TO EXTRACTION BY WATER, SOAP AND DETERGENT SOLUTION

This test is a modification of the methods used elsewhere. Duplicate samples, 1.0 x 3.0 x 0.065 inches, are weighed analytically and immersed in the water, soap and detergent solutions.

The water is changed every working day and kept at 25° C., cooled in a desiccator and weighed. The loss is calculated.

The soap solution is 1% Ivory flakes while the detergent solution is 1% Rinso. The samples are put into the solutions at 80° C. and this temperature maintained for 48 hours. The samples are rinsed and then oven dried at 80° C. for one hour. After cooling in a desiccator, the samples are weighed and the calculations made.

The experimental polymers were found to be as good as the control materials in water, Ivory soap, and Rinso extraction tests.

RESISTANCE TO OIL EXTRACTION

This test is a modified procedure of ASTM D543–43 and is intended for use in determining the resistance of a plastic to a light mineral oil. Test specimens are cut from milled stock and immersed in a clear white mineral oil for 7 days at 25° C. Changes in weight and appearance of the test specimens are observed and reported.

The higher molecular weight experimental plasticizers and the acetic acid end-blocked one have excellent resistance to extraction by oil. They are better than the control materials representing other polymeric plasticizers.

Results of the oil extraction tests are shown in Table V.

Table V
[Oil extraction tests]

|  | Control #1 | Control #2 | Control #3 | Polyester #2 | Polyester #3 | Polyester #4 |
|---|---|---|---|---|---|---|
| Plasticizer Concentration, parts/100 parts resin. | 50<br>60<br>66<br>75 | 50<br>60<br>66<br>75 | 50<br>66<br>75 | 40<br>50<br>60 | 40<br>50<br>60 | 40<br>50<br>60 |
| Oil Resistance, Percent | 0.0<br>0.0<br>0.0<br>0.0 | 0.0<br>0.0<br>0.0<br>0.0 | −.14<br>−.47<br>−.62 | .00<br>−.01<br>−.02 | .00<br>.00<br>−.01 | +.01<br>+.01<br>+.01 |

MIGRATION

This test is a procedure for evaluating the resistance of various surface finishes to plasticized vinyl stocks.

Four tests finishes (white enamel, varnish, metal lacquer, and furniture lacquer) are applied to tin panels and allowed to dry at least one week. Strips of the milled stock are placed in intimate contact with the finishes and stored at 25° C. under 0.25 pound per square inch pressure. At intervals, the specimens and finishes are examined.

Migration can also be measured quantitatively using silicic acid as an absorbent. The test employed was a modification of the method of Grafton and Greenly.

Duplicate specimens, 2.69 inches in diameter x .065 inches thick, are weighed analytically. 25 cc. of silicic acid, AR–100 mesh, are placed in a half-pint paint can (slightly larger in diameter than the specimens). A sample is placed on the acid and covered with 25 cc. of acid. The second sample is introduced and covered with 25 cc. of acid. An aluminum foil barrier is inserted and the arrangement repeated until the can is full. Hardwood filler blocks (same diameter as samples) are inserted and a 20-lb. weight placed on top. The arrangement is left for four days when the samples are removed, brushed clean and weighed. The percent plasticizer loss is reported as is the original concentration of plasticizer. The migration test results are shown in Table VI.

Table VI
[Migration tests]

|  | Control #1 | Control #2 | Control #3 | Polyester #2 | Polyester #3 | Polyester #4 |
|---|---|---|---|---|---|---|
| Plasticizer Concentration, parts/100 parts resin. | 50<br>60<br>66<br>75 | 50<br>60<br>66<br>75 | 50<br>66<br>75 | 40<br>50<br>60 | 40<br>50<br>60 | 40<br>50<br>60 |
| Migration (Silicic Acid), Percent | −.05<br>−.14<br>−.17 | −.12<br>−.15<br>−.20 | −.18<br>−.49<br>−.65 | −.07<br>−.09<br>−.14 | −.06<br>−.05<br>−.08 | −.06<br>−.06<br>−.06 |
| Migration, 25° C., 0.25 p.s.i. at 33.3% plasticizer, after 2 months. | None | None | (1) | (2) | None | None |

1 Slight softening of lacquers.
2 Very slight softening of varnish and lacquers.

The quantitative determination of migration by the silicic acid absorption method shows that the experimental polyesters, including the acetic acid end-blocked plasticizer, are superior to even the best of the control materials. Especially in compositions using higher concentrations of the plasticizers, the experimental polyesters are shown to be better. This is outstanding and unexpected in terms of the usual properties. The panel method shows the highest molecular weight material and the acetic acid end-blocked one to be equivalent to the best, control #1, that is, they show no migration. The other shows only a slight attack on the varnish lacquers.

TENSILE PROPERTIES

The tensile properties of the milled stocks were determined for each of the plasticizers. These tensile properties are tensile strength, 100% elastic modulus, and percent ultimate elongation. The test machine used is the Scott IP–4 Tensile Tester. The test specimen is annular in shape and is mounted in the test machine by placing it over two parallel, perpendicular pins or posts.

The tensile strengths of the experimental materials were surprisingly better. At a plasticizer concentration of 50 parts per 100 parts of resin, polymers #2 and #3 gave tensile values of 3990 and 4000 respectively, while the tensile strength values for the controls ranged from 3640 to 3880.

HARDNESS—SHORE TEST

This test is a convenient means for determining an indication of the approximate hardness of a plastic or its resistance to scratching abrasion. It is based on ASTM test D676-47T.

Sheets of the milled stock are plied up to approximately 0.25 inch. Using a Shore A2 Durometer, readings are taken immediately and again after 10 seconds. An examination of this property shows that the Shore Hardness of the experimental polymers is somewhat higher than that of the control material at equivalent flexibilities.

EFFICIENCY

Using the Scott tensil tester, Model IP-4, the 100% elastic modulus is obtained from the stock containing various amounts of the plasticizer per 100 parts of the resin by weight.

A graph can then be made by plotting weight of plasticizer versus the pound per square inch for 100% elongation. From this graph there is selected the weight of plasticizer which corresponds to 3600 p.s.i.

The efficiency is defined as the weight of plasticizer per 100 grams of resin to give 100% elongation under a load of 3600 pounds per square inch. Since it requires more of a less efficient plasticizer to give the same plasticity, the economic value of a plasticizer is based on its efficiency. The results are shown in Table VII. All the polyesters show higher efficiency values than the control materials.

Table VII

[Plasticizer efficiency]

|  | Control #1 | Control #2 | Control #3 | Polyester #2 | Polyester #3 | Polyester #4 |
|---|---|---|---|---|---|---|
| Efficiency, percent plasticizer to give 100% elongation at load of 3,600 p.s.i. | 31.3 | 32.3 | 28.7 | 30.8 | 31.4 | 26.3 |

What is claimed is:

1. A polyester of at least one organic glycol and a carboxylic acid reactant including in major proportion a mixture of $C_{10}$ isomeric aliphatic diacids comprising essentially about 60-90% α-ethylsuberic acid, about 10-25% α,α'-diethyladipic acid and the remainder sebacic acid.

2. A polyester of at least one organic glycol and a mixture of $C_{10}$ isomeric aliphatic diacids comprising essentially about 60-90% α-ethylsuberic acid, about 10-25% of α,α'-diethyladipic acid, and the remainder, sebacic acid.

3. A composition of matter comprising 100 parts by weight of a brittle, plasticizable vinyl resin selected from the group consisting of polyvinyl chloride, polyvinyl acetate, copolymers of vinyl chloride and vinyl acetate, polyvinyl acetals, polyvinylidene chlorides, and mixtures thereof, and from 5 parts to 100 parts by weight of a polyester of a mixture of $C_{10}$ aliphatic isomeric diacids consisting essentially of about 60-90% α-ethylsuberic acid, about 10-25% of α,α'-diethyladipic acid, and the remainder, sebacic acid.

4. A composition of matter comprising 100 parts by weight of a brittle, plasticizable vinyl resin selected from the group consisting of polyvinyl chloride, polyvinyl acetate, copolymers of vinyl chloride and vinyl acetate, polyvinyl acetals, polyvinylidene chlorides, and mixtures thereof, and from 5 parts to 100 parts by weight of a polymeric polyester of a mixture of $C_{10}$ aliphatic isomeric diacids, consisting essentially of about 60-90% α-ethylsuberic acid, 12-25% α,α'-diethyladipic acid and up to 15% sebacic acid.

5. A process which comprises reacting a mixture of at least one glycol and a carboxylic acid reactant to produce polymeric polyesters, said carboxylic acid reactant including in major proportion a mixture of branched chain $C_{10}$ saturated aliphatic dicarboxylic acids containing about 60-90% α-ethylsuberic acid, about 10-25% α,α'-diethyladipic acid, and the remainder sebacic acid.

6. A process which comprises reacting a mixture of an organic glycol and a dicarboxylic acid reactant comprising a mixture of $C_{10}$ saturated aliphatic dicarboxylic acids, said dicarboxylic acid reactant containing about 60-90% α-ethylsuberic acid, about 10-25% α,α'-diethyladipic acid, and the remainder sebacic acid to produce polymeric polyesters.

References Cited in the file of this patent

UNITED STATES PATENTS

| 2,352,461 | Walker | June 27, 1944 |
| 2,617,779 | Griffith et al. | Nov. 11, 1952 |
| 2,773,092 | Carley et al. | Dec. 4, 1956 |
| 2,790,002 | Frank et al. | Apr. 23, 1957 |
| 2,795,625 | Nobis | June 11, 1957 |